(12) United States Patent
Shao et al.

(10) Patent No.: US 7,782,836 B2
(45) Date of Patent: Aug. 24, 2010

(54) METHOD AND SYSTEM FOR TRANSMISSION OF DIFFERENT TYPES OF INFORMATION IN WIRELESS COMMUNICATION

(75) Inventors: Huai-Rong Shao, San Jose, CA (US); Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 720 days.

(21) Appl. No.: 11/725,859

(22) Filed: Mar. 20, 2007

(65) Prior Publication Data
US 2007/0223527 A1    Sep. 27, 2007

Related U.S. Application Data

(60) Provisional application No. 60/785,772, filed on Mar. 24, 2006.

(51) Int. Cl.
*H04J 3/22* (2006.01)
(52) U.S. Cl. .................. 370/349; 370/468; 714/748; 714/749
(58) Field of Classification Search ......... 714/748–749; 370/349, 468
See application file for complete search history.

(56) References Cited

U.S. PATENT DOCUMENTS

| | | | |
|---|---|---|---|
| 5,231,494 A * | 7/1993 | Wachob | 348/385.1 |
| 5,436,905 A | 7/1995 | Li et al. | |
| 5,475,716 A * | 12/1995 | Huang | 375/354 |
| 5,943,327 A | 8/1999 | Mademann | |
| 6,526,036 B1 * | 2/2003 | Uchida et al. | 370/342 |
| 6,532,224 B1 | 3/2003 | Dailey | |
| 6,826,183 B1 | 11/2004 | Itoi | |
| 6,842,460 B1 | 1/2005 | Olkkonen et al. | |
| 6,944,148 B1 | 9/2005 | Gehring et al. | |
| 6,980,541 B2 | 12/2005 | Shvodian | |
| 7,031,249 B2 * | 4/2006 | Kowalski | 370/203 |

(Continued)

FOREIGN PATENT DOCUMENTS

EP    1104141 A2 *    5/2001

(Continued)

OTHER PUBLICATIONS

Notification of transmittal of the international search report and the written opinion of the international searching authority, or the declaration, International Application No. PCT/KR2007/002437, Dec. 18, 2007.

(Continued)

*Primary Examiner*—Kent Chang
*Assistant Examiner*—Kashif Siddiqui
(74) *Attorney, Agent, or Firm*—Kenneth L. Sherman, Esq.; Michael Zarrabian, Esq.; Myers Andras Sherman LLP

(57) ABSTRACT

A method and system for wireless communication of different information types over a wireless channel, is provided. Information comprising different information types is formed into a composite aggregation of the different information types, and the composite aggregation is transmitted from a sender to a receiver over a wireless channel. A composite acknowledgement (ACK) format is utilized by the receiver to reduce the overhead in low-rate channels.

53 Claims, 13 Drawing Sheets

U.S. PATENT DOCUMENTS

| | | | |
|---|---|---|---|
| 7,075,943 B2 | 7/2006 | Bahl | |
| 7,088,702 B2 | 8/2006 | Shvodian | |
| 7,110,783 B2 | 9/2006 | Bahl et al. | |
| 7,120,126 B2 | 10/2006 | Odman et al. | |
| 7,136,929 B2* | 11/2006 | Koprivica | 709/232 |
| 7,184,767 B2 | 2/2007 | Gandolfo | |
| 7,245,628 B2 | 7/2007 | Shi et al. | |
| 7,280,518 B2 | 10/2007 | Montano et al. | |
| 2001/0019542 A1 | 9/2001 | Diachina et al. | |
| 2001/0055322 A1* | 12/2001 | Domon | 370/537 |
| 2002/0059614 A1 | 5/2002 | Lipsanen et al. | |
| 2002/0061024 A1 | 5/2002 | Malkemes et al. | |
| 2003/0174243 A1 | 9/2003 | Arbeiter | |
| 2005/0002525 A1* | 1/2005 | Alkove et al. | 380/37 |
| 2005/0083896 A1 | 4/2005 | Hong et al. | |
| 2005/0135611 A1 | 6/2005 | Hardacker | |
| 2005/0220145 A1 | 10/2005 | Nishibayashi et al. | |
| 2005/0226222 A1 | 10/2005 | Qian et al. | |
| 2005/0238016 A1 | 10/2005 | Nishibayashi et al. | |
| 2006/0018332 A1* | 1/2006 | Kakani et al. | 370/428 |
| 2006/0067416 A1 | 3/2006 | Tirkkonen et al. | |
| 2006/0078001 A1 | 4/2006 | Chandra et al. | |
| 2007/0130613 A1* | 6/2007 | Choi | 725/151 |
| 2007/0147284 A1 | 6/2007 | Sammour et al. | |
| 2007/0168822 A1* | 7/2007 | Vitebsky et al. | 714/748 |
| 2007/0230338 A1 | 10/2007 | Shao et al. | |
| 2007/0286107 A1 | 12/2007 | Singh et al. | |
| 2007/0286130 A1 | 12/2007 | Shao et al. | |
| 2008/0045153 A1 | 2/2008 | Surineni et al. | |
| 2008/0098274 A1* | 4/2008 | Kwon et al. | 714/748 |
| 2008/0130741 A1* | 6/2008 | Chiang et al. | 375/240.01 |
| 2008/0192726 A1* | 8/2008 | Mahesh et al. | 370/349 |

FOREIGN PATENT DOCUMENTS

| | | | |
|---|---|---|---|
| WO | 2004100438 A2 | 11/2004 | |
| WO | WO 2004100438 A2 | 11/2004 | |

OTHER PUBLICATIONS

IEEE 802.11, Standard for Information Technology—Telecommunications and Information Exchange between Systems—Local and Metropolitan Area Networks—Specific requirements Part 11: Wireless LAN Medium Access Control (MAC) and Physical Layer (PHY) Specifications—2007 (Revision of IEEE Std 802.11-1999), pp. 1-528, United States.

International Search Report for PCT/KR2007/003154 dated Dec. 14, 2007, Korean Intellectual Property Office, 2 pages, Korea.

IEEE 802.15.3 Working Group. Part 15.3: Wireless medium access control (MAC) and physical layer (PHY) specifications for high rate wireless personal area networks (WPAN). IEEE Draft Standard, Draft P802.15.3/D16, Feb. 2003, pp. 1-362, United States.

MBOA, Distributed Medium Access Control (MAC) for wireless networks, WiMedia Alliance, Draft 0.99, Nov. 1, 2005, pp. 1-182, United States.

Maruhashi, K. et al., "Wireless uncompressed-HDTV-signal transmission system utilizing compact 60-GHz-band transmitter and receiver," Microwave Symposium Digest, 2005 IEEE MTT-S International, Jun. 12-17, 2005, pp. 1867-1870, United States.

Sammour, M. et al., U.S. Appl. No. 60/719,035, filed Sep. 21, 2005, published in Publication No. 20070147284, pp. 1-70, United States.

U.S. Non-Final Office Action for U.S. Appl. No. 11/724,419 mailed Jul. 6, 2009.

Hitachi, Ltd. et al., High-Definition Multimedia Interface (HDMI) Specification Version 1.2, Aug. 22, 2005, pp. 1-214. U.S.

U.S. Non-Final Office Action for U.S. Appl. No. 11/711,302 mailed Nov. 27, 2009.

* cited by examiner

10

28B

METHOD AND SYSTEM FOR TRANSMISSION OF DIFFERENT TYPES OF INFORMATION IN WIRELESS COMMUNICATION

RELATED APPLICATION

This application claims priority from U.S. Provisional Patent Application Ser. No. 60/785,772, filed on Mar. 24, 2006, incorporated herein by reference.

FIELD OF THE INVENTION

The present invention relates to transmission of video information and in particular, to transmission of uncompressed video over wireless communication channels.

BACKGROUND OF THE INVENTION

With the proliferation of high quality video, an increasing number of electronic devices (e.g., consumer electronic devices) utilize high definition (HD) video which can require more than 1 Gbps (giga bits per second) in bandwidth for transmission. As such, when transmitting such HD video between devices, conventional transmission approaches compress the HD video to a fraction of its size to lower the required transmission bandwidth. The compressed video is then decompressed for consumption. However, with each compression, and subsequent decompression of the video data, some data can be lost and the picture quality can be degraded.

The High-Definition Multimedia Interface (HDMI) specification allows for the transfer of uncompressed HD signals between devices via a cable. While consumer electronics makers are beginning to offer HDMI-compatible equipment, there is not yet a suitable wireless (e.g., a radio frequency) technology that is capable of transmitting uncompressed HD video signals. Wireless local area network (WLAN) and similar technologies can suffer interference issues when several devices are connected which do not have the bandwidth to carry the uncompressed HD signal, and do not provide an air interface to transmit uncompressed video over 60 GHz band. There is, therefore, a need for a method and system for wireless transmission of uncompressed video information.

BRIEF SUMMARY OF THE INVENTION

The present invention provides a method and system for transmission of different types of information in wireless communication of video information. This is achieved by aggregating different types of information for wireless communication of video, audio, control, and data information. An example involves transmission of uncompressed HD video information between wireless stations communicating over a wireless channel, such as in wireless networks.

The aggregation process comprises forming a composite aggregation packet for transmission of different types of information (e.g., audio, video, control messages), between wireless stations. In addition, a composite acknowledgement (ACK) format is utilized in the aggregation process.

The aggregation of different types of information into composite packages, along with corresponding composite ACK packages, increases transmission efficiency in wireless networks, and reduces overhead in low-rate channels. For example, transmission efficiency is increased for wireless HD video transmission in wireless networks that use Time Division Duplex (TDD) for coordinating high-rate and low-rate channels.

These and other features, aspects and advantages of the present invention will become understood with reference to the following description, appended claims and accompanying figures.

DETAILED DESCRIPTION OF THE INVENTION

The present invention provides a method and system for aggregating different types of information for wireless communication of video information, and in particular, transmission of uncompressed HD video information between wireless stations communicating over a wireless channel.

In many wireless communication systems, a frame structure is used for data transmission between a transmitter and a receiver. For example, the IEEE 802.11 standard uses frame aggregation in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header (i.e., a PHY preamble) thereto to construct a PHY Protocol Data Unit (PPDU). The PHY header includes parameters for determining a transmission scheme including a coding/modulation scheme.

Typically, the most reliable coding/modulation scheme is applied to a PHY signal field in the PHY header, and an additional cyclic redundancy code (CRC) check is added to ensure this information is received correctly at the receiver. The MAC header and payload data in the MSDU are usually treated equally and transmitted using the same coding/modulation scheme, which is less robust than that for the PHY signal field of the PHY header. Further, before transmission as a packet from a transmitter to a receivers a preamble is attached to the PPDU, wherein the preamble can include channel estimation and synchronization information.

In one embodiment, an aggregation process according to the present invention comprises forming a composite aggregation packet for transmission of audio, video and control messages, etc., between wireless stations. In addition, a composite ACK format is utilized in the aggregation process to reduce the overhead in low-rate channels. The aggregation process improves transmission efficiency for wireless HD video transmission in wireless networks wherein TDD is used for coordinating high-rate and low-rate channels.

Figure 1:
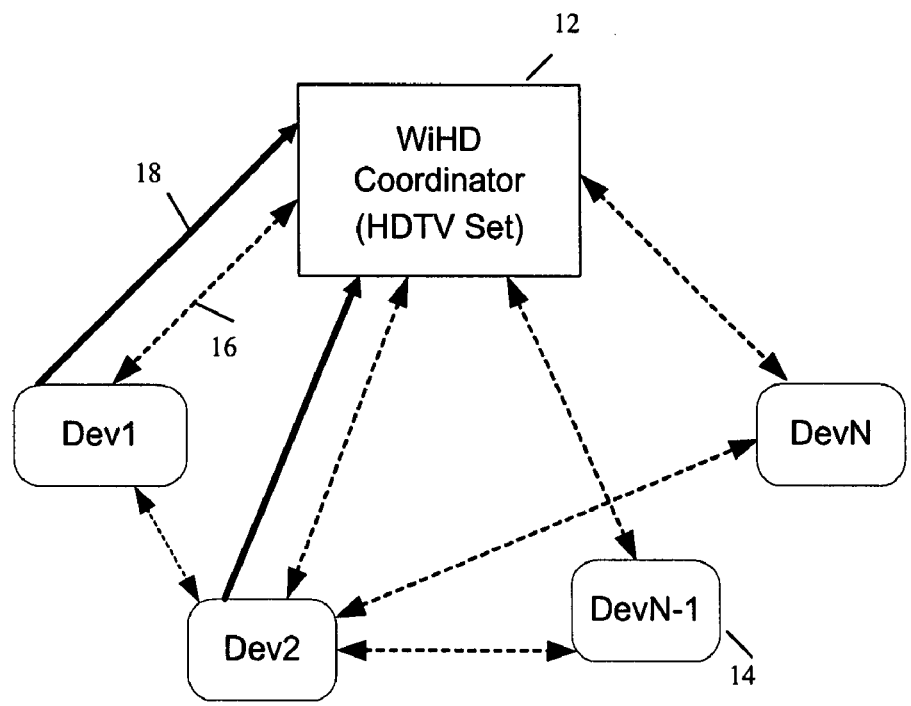
FIG. 1 shows a functional block diagram of a wireless network that implements uncompressed HD video transmission between wireless stations by aggregating information types, according to an embodiment of the present invention.

FIG. 1 shows a functional block diagram of a wireless network 10 that implements uncompressed HD video transmission between wireless stations, according to an embodiment of the present invention. The network 10 includes a coordinator 12, such as a wireless HD (WiHD) coordinator, and multiple wireless stations 14 (e.g., Dev1, . . . , DevN). The coordinator 12 and the stations 14 utilize a low-rate channel 16 (dashed lines in FIG. 1) and a high-rate channel 18 (heavy solid lines in FIG. 1) for communication there between.

In this example, the coordinator 12 is a sink of video and/or audio data implemented, for example, in a HDTV set in a home wireless network environment, which is a type of WLAN. The coordinator need not be tied with a sender or receiver, and further can be either a video source or a video sink. As such, the coordinator can be implemented in a station or separately.

Each station 14 comprises a device that can be the source of uncompressed video or audio. Examples of each device can be a set-top box, a DVD player, etc. A station 14 can also be an audio sink.

The coordinator 12 uses the low-rate channel 16, and the high-rate channel 18, for communication with the stations 14. Each station 14 uses the low-rate channel 16 for communication with other stations 14. The high-rate channel 18 only supports single direction unicast transmission with, e.g., multi-Gb/s bandwidth to support uncompressed HD video. The low-rate channel 16 can support bi-directional transmission, e.g., with at most 40 Mbps (megabits per second) throughput. The low-rate channel 16 is mainly used to transmit control frames, such as ACK frames.

Figure 2:
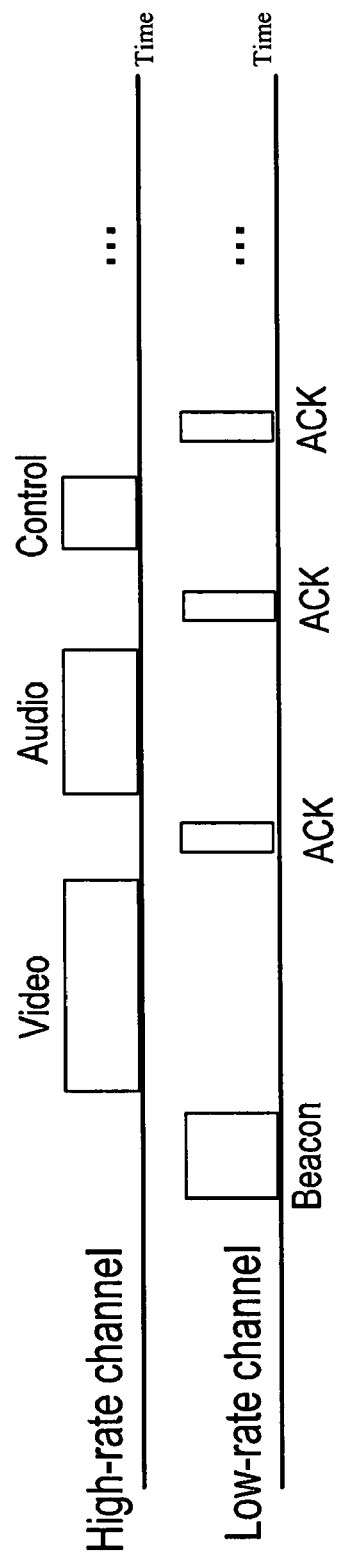
FIG. 2 shows an example timing diagram for TDD scheduling applied to low-rate and high-rate wireless communication channels in FIG. 1.

As shown by the example timing diagram in FIG. 2, TDD scheduling is applied to the low-rate and high-rate channels 16 and 18, whereby at any one time the low-rate and high-rate channels 16 and 18, cannot be used in parallel for transmission. In FIG. 2, Beacon and ACK frames are transmitted over the low-rate channel 16 in between the transmission of video packets, audio and control information over the high-rate channel 18.

For the same amount of information, the transmission duration over the high-rate channel 18 is much shorter than over the low-rate channel 16. Therefore, the high-rate channel 18 should be utilized as long as a packet can be transmitted over the high-rate channel 18, rather than over the low-rate channel 16, to achieve high system throughput.

However, since the high-rate channel 18 can only support single-direction unicast transmission, use of the low-rate channel 16 is necessary for bi-directional transmissions. For example, after a video packet is transmitted from a station 14 to the coordinator 12 over the high-rate channel 18, an ACK packet would be sent back from the coordinator 12 to that station 14 over the low-rate channel 16. Since switching between the high-rate and low-rate channels 16 and 18 requires a transition period, frequent channel switching wastes bandwidth and can degrade the network throughput since no data can be transmitted during a channel switch time.

To reduce bandwidth waste caused by channel switching for communicating different types of information over different channels, in one embodiment the present invention utilizes a composite WiHD packet format specifying the aggregation of different types of information such as video, audio, data, control messages, etc. Information of the same type can be placed into different sub-packets to provide more robust transmission.

Figure 3:
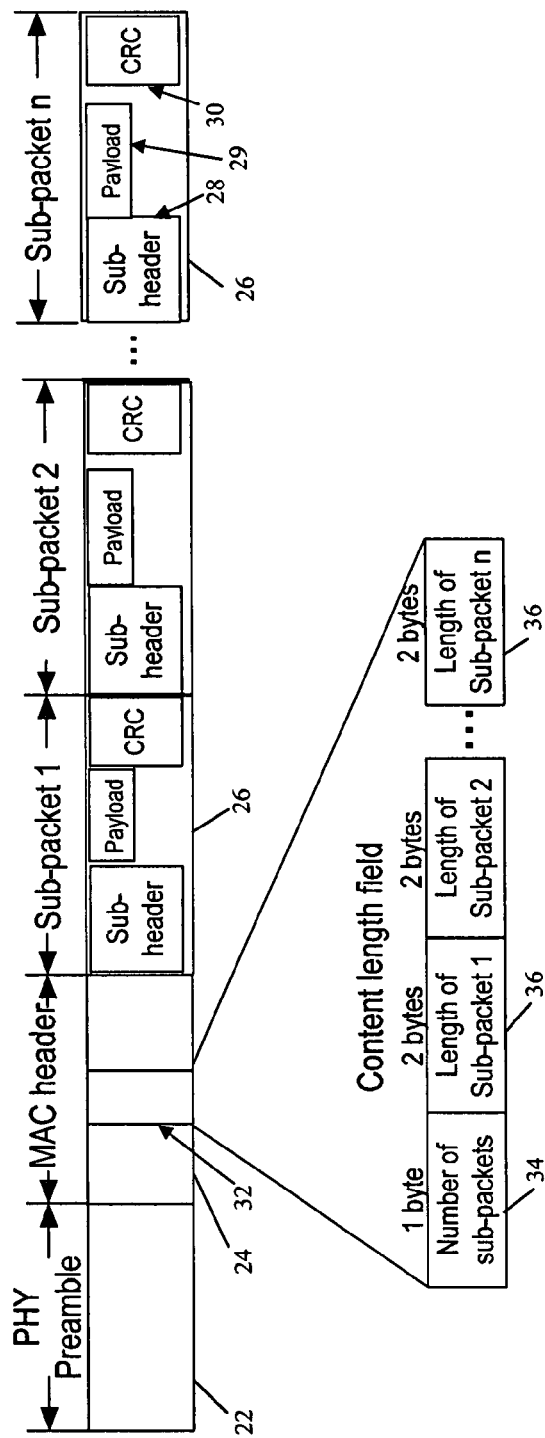
FIG. 3 shows an example composite packet format for aggregating different information types into a packet, according to the present invention.

FIG. 3 shows an example composite WiHD packet format 20, comprising a PHY Preamble 22, a MAC header 24, and multiple Sub-packets 26 (i.e., Sub-packet 1, . . . , Sub-packet n). Each Sub-packet 26 includes a Sub-header 28, a Payload 29 and a Cyclic Redundancy Check (CRC) 30. The MAC header 24 includes a Content length field 32 comprising a Number of sub-packets field 34, and multiple Length of Sub-packet fields 36 (i.e., Length of Sub-packet 1, . . . , Length of Sub-packet n), corresponding to the multiple Sub-packets 26.

The composite packet 20 includes sub-packet and information type location/length information, such as in fields 32, 34, 36 and 28 described herein, to allow a receiver to use such sub-packet and information type location/length information, for locating and retrieving the different information types within the composite packet 20.

The Content length field 32 is added to the MAC header 24, and uses one byte for the Number of sub-packets field 34 to indicate the number of Sub-packets 26 in the packet 20. The Content length field 32 uses two bytes for each Length of Sub-packet field 36 to indicate the length of each Sub-packet 26.

Figure 4:
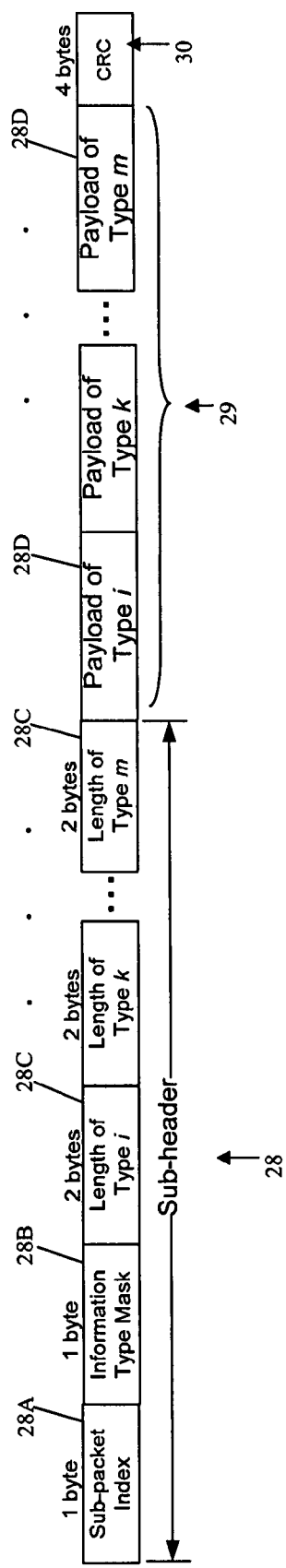
FIG. 4 shows further details of the format of a sub-packet in FIG. 3.

FIG. 4 shows further details of the format of a Sub-packet 26 in FIG. 3. The Sub-header 28, located at the beginning of the Sub-packet 26, comprises a Sub-packet Index 28A, an Information Type Mask 28B, and one or more Length of Type fields 28C. Further, the Payload field 29 includes one or more Payload of Type fields 28D.

In this example, the Sub-packet index 28A is a 1 byte field indicating the sequence number of that Sub-packet 26 within the packet 20. Further, the Information Type Mask 28B (shown in more detail in FIG. 5) is a 1 byte field, indicating different information types based on bit settings therein. For example, if an information type bit is set to "1" in the Information Type Mask 28B, then: (1) there is a corresponding Length of Type field 28C for that type in the Sub-header 26, and (2) there is an information Payload of Type field 28D for that information type in the Sub-packet payload 29.

If an information type bit is set to "0" in the Information Type Mask 28B, then there are no fields 28C, 28D for that information type in the Sub-packet 26. The sequence (order) of the Length of Type fields 28C (i.e., Length of Type i, Length of Type k, . . . , Length of Type m) in the Sub-header 28 is the same as the sequence (order) of the corresponding information type bits in the Information Type Mask 28B. Similarly, the sequence (order) of the Payload of Type field 28D (i.e., Payload of Type i, Payload of Type k, . . . , Payload of Type m) in the Payload field 29 is the same as the sequence (order) of the corresponding information type bits in the Information Type Mask 28B, and the same as the sequence (order) of the corresponding Length of Type fields 28C (i.e., Length of Type i, Length of Type k, ..., Length of Type m) in the Sub-header 28.

Figure 5:
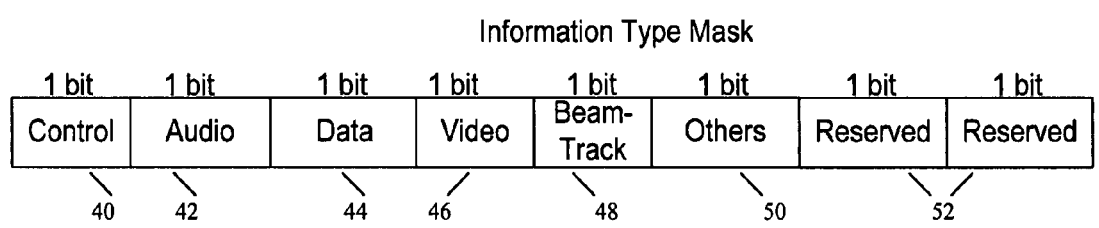
FIG. 5 shows the details of an Information Type Mask in the sub-packet in FIG. 4.

As noted, FIG. 5 shows details of the Information Type Mask 28B of a Sub-packet 26, including a Control bit 40, an Audio bit 42, a Data bit 44, a Video bit 46, a Beam-Track bit 48, an Others bit 50 and two Reserved bits 52. Each of the bits 42, 44, 46, 48 and 50, when set (i.e., set to "1"), indicates that information of that type is in the Payload 29 of that Sub-packet 26.

The sender station 14 or the coordinator 12 can generate such a composite packet 20 including a CRC value for the payload in each Sub-packet 26, and then transmits the composite packet 20 to the receiving station 14. If uncompressed video data is included in the composite packet, then the packet 20 is transmitted over the high-rate channel 18, otherwise, the packet 20 can be transmitted over the low-rate channel 16. Transmitting one composite packet 20 for different information types, rather than transmitting different packets for different information types, reduces transmission overhead.

After receiving the composite packet 20, the receiving station 14 uses the packet and Sub-packet field information (e.g., fields 32, 34, 36, 28 (FIG. 3)) in the composite packet 20 to locate and retrieve the different information types including payloads 29 in Sub-packets 26 within the composite packet 20. The receiving station 14 further uses the CRC information 30 corresponding to each Sub-packet 26 to conduct a CRC check for the payload 29 of each Sub-packet 26. The station 14 then forms a Composite ACK packet 60, shown in FIG. 6, based on the CRC check and transmits the Composite ACK packet 60 back to the sender over the low-rate channel 16.

Figure 6:
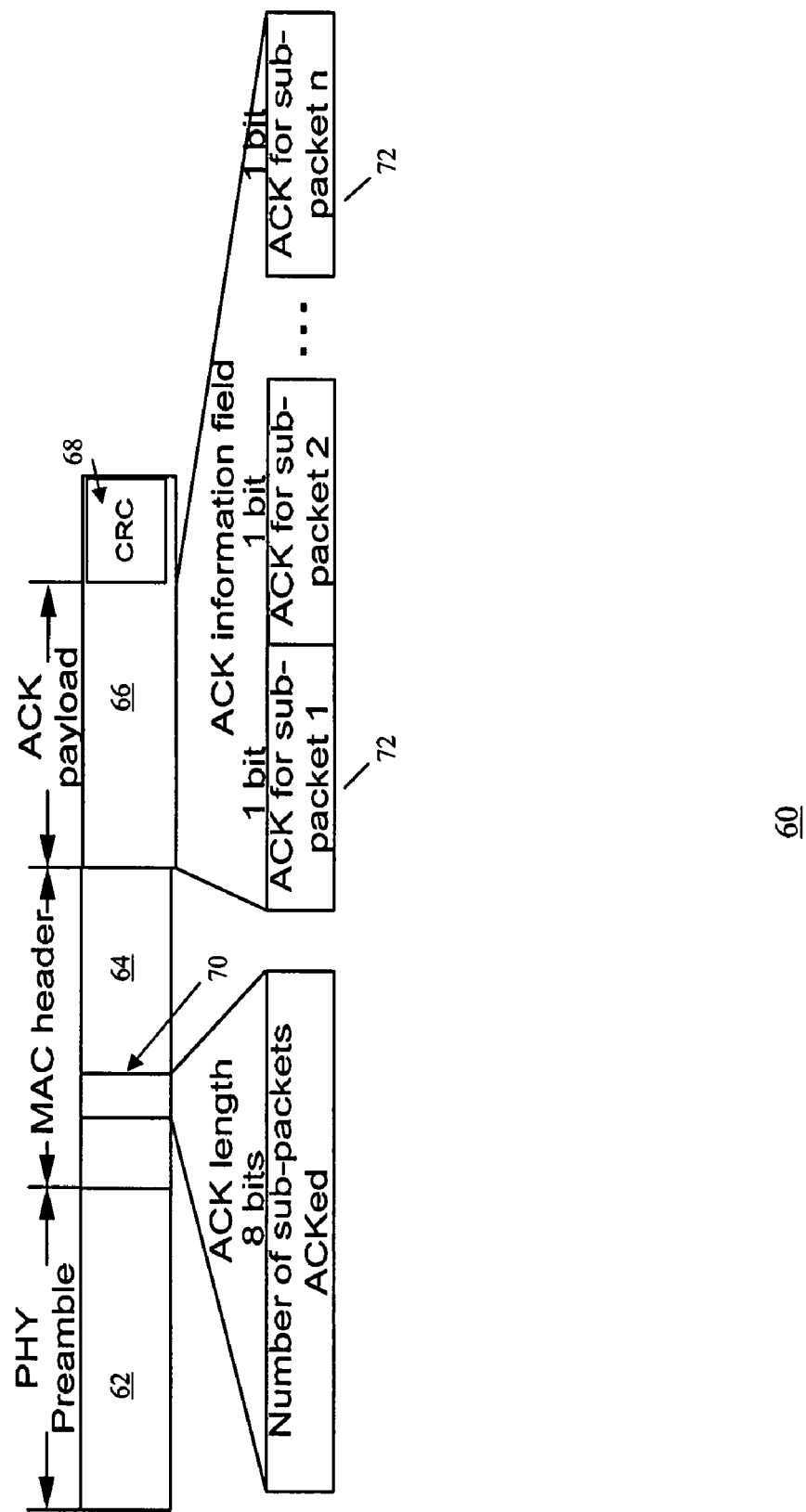
FIG. 6 shows the format of an example composite ACK packet according to the present invention.

As shown in FIG. 6, the Composite ACK packet 60 (corresponding to the composite packet 20), comprises a PHY Preamble 62, a MAC header 64, an ACK payload 66 including a CRC field 68 for the ACK payload 66. The MAC header 64 includes an ACK length field 70 which indicates the number of Sub-packets 26 that are acknowledged in the payload 66 of the ACK packet 60. The ACK payload 66 further includes multiple acknowledgments for sub-packet fields 72, each providing an ACK for a Sub-packet 26 in a received composite packet 20. Transmitting one Composite ACK packet 60 to acknowledge a composite packet 20 that includes different information types, rather than transmitting different ACK packets for different information types, reduces transmission overhead over the low-rate channel 16.

Figure 7:
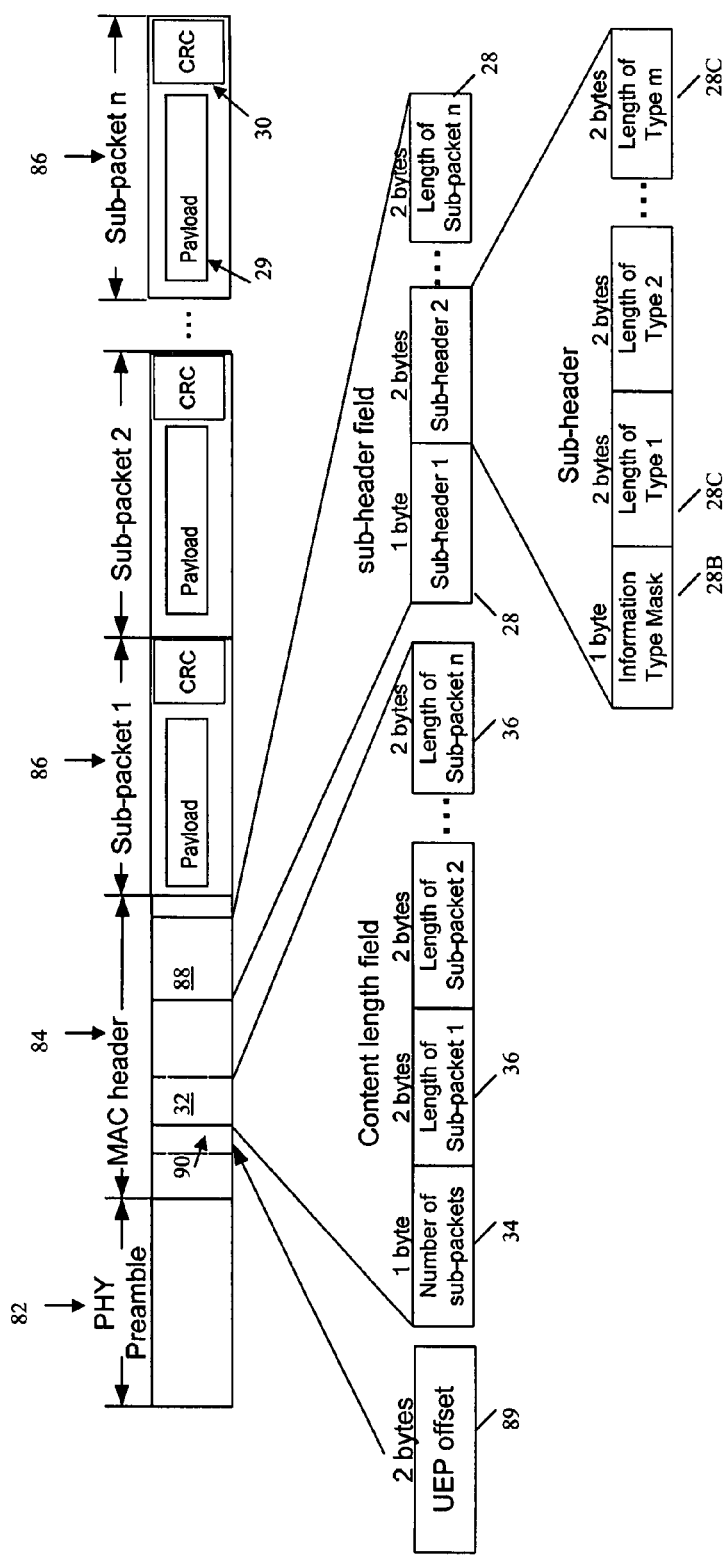
FIG. 7 shows another example composite packet utilizing Unequal Error Protection (UEP) for some of the information in the packet, according to the present invention.
Figure 8:
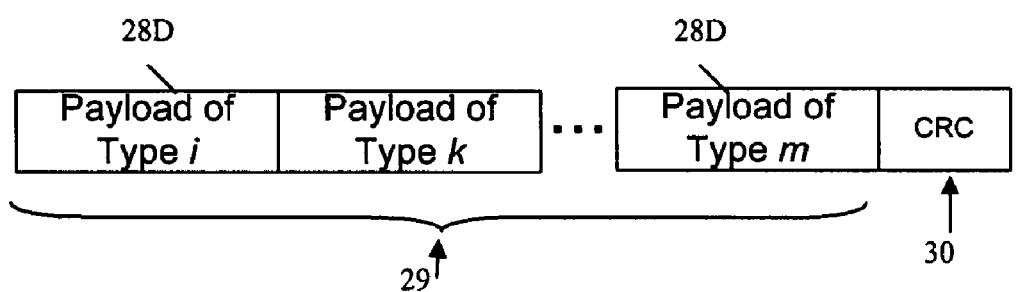
FIG. 8 shows further details of each sub-packet in the packet of FIG. 7.

FIG. 7 shows another example format for a composite WiHD packet 80 when UEP is applied to some of the information in the packet. The packet 80 comprises a PHY Preamble 82, a MAC header 84 and multiple Sub-packets 86. Compared to the composite packet 20 of FIG. 3, in the composite packet 80 (FIG. 7) all Sub-packet Sub-headers 28 have been moved from the Payload 29 into a Sub-header field 88 in the MAC header 84 to simplify the UEP operation. The MAC header 84 further includes a UEP offset field 89 that indicates the offset of UEP in the packet 80. The offset of UEP indicates the location where UEP processing begins. FIG. 8 shows further details of each Sub-packet 86 of the packet 80, wherein each Sub-packet 86 includes a Payload 29 and a corresponding CRC value 30, such that the Payload 29 includes multiple Payload of Type fields 28D as in FIG. 4.

Figure 9A:
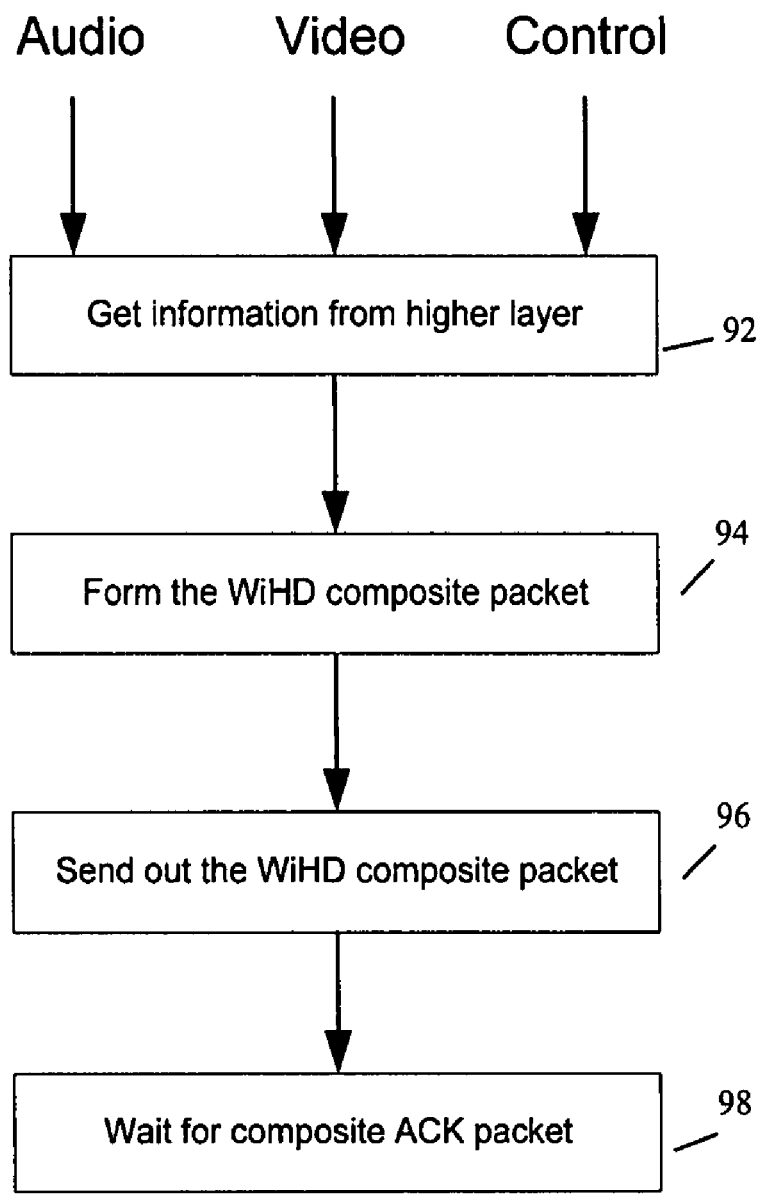
FIGS. 9A-B show flowcharts of example communication processes between a sender and a receiver in a wireless network, using a composite packet and a composite ACK packet, according to the present invention.
Figure 9B:
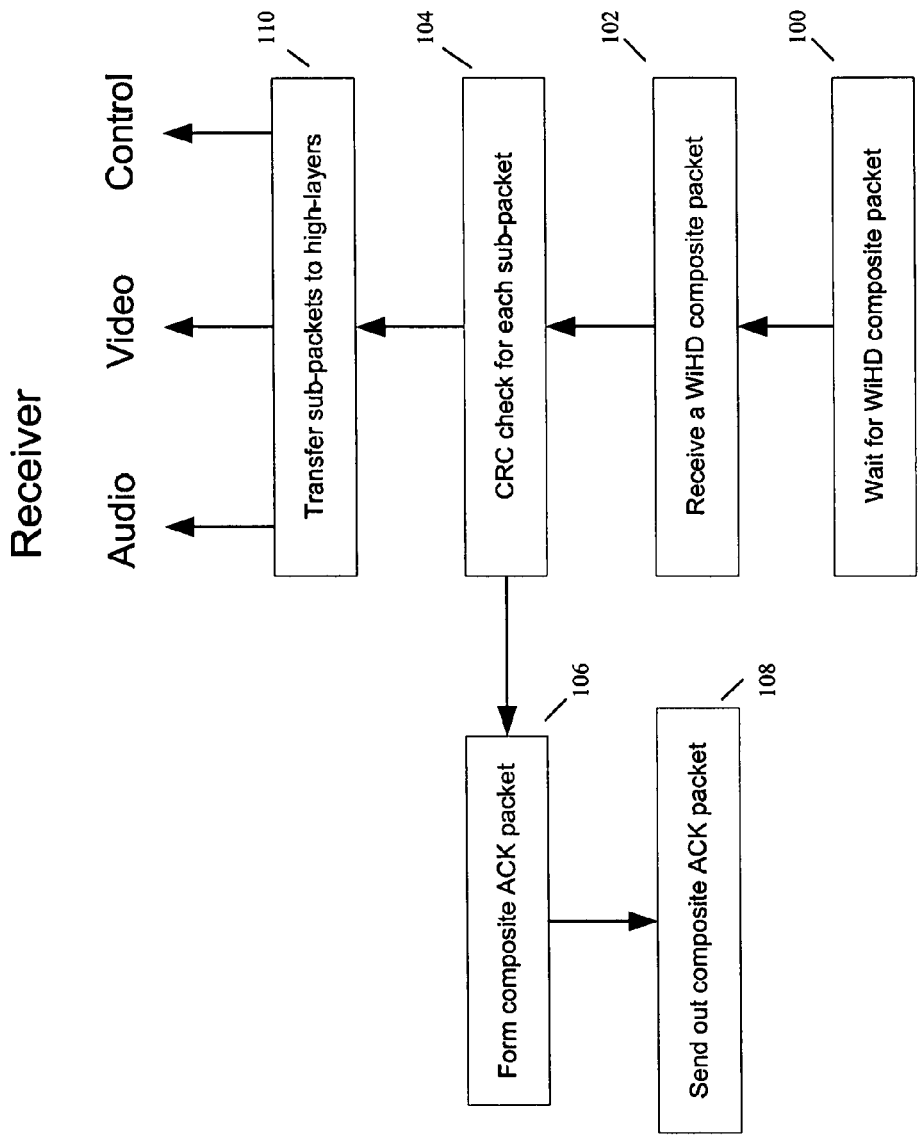

FIGS. 9A-B show flowcharts of example communication process 90 and 91 for a wireless sender (e.g., coordinator 12, station 14) and a wireless receiver (e.g., station 14, coordinator 12), respectively, in the network 10, according to the present invention. The communication processes use the WiHD Composite Packet 20 (or 80) and the Composite ACK packet 60, for implementing the aggregation of different types of information. The communication processes 90 and 91 include the steps of:

Sender steps (FIG. 9A):

Step 92: Obtain information to transmit. Such information can include, e.g., audio, video, control message (e.g., a user control command, such as a TV program switch, etc.).

Step 94: Form a WiHD Composite Packet using the obtained information.

Step 96: Transmit the WiHD Composite Packet to the receiver (over the low-rate channel 16 or the high-rate channel 18).

Step 98: Wait for a Composite ACK Packet from the receiver. Upon receipt, the sender checks the ACK bit for each sub-packet, wherein if the bit is "0" indicating error, the sender retransmits the sub-packet if time allows.

Receiver steps (FIG. 9B):

Step 100: Wait for a WiHD Composite Packet from the sender.

Step 102: Receive a WiHD Composite Packet from the sender.

Step 104: Perform a CRC check for each Sub-packet in the WiHD Composite Packet. Pass sub-packets with a successful CRC check (i.e., no error) for transfer to higher layers in step 110.

Step 106: Form a Composite ACK packet based on the CRC check in step 104, indicating sub-packets received in error.

Step 108: Transmit the Composite ACK packet to the sender over the low-rate channel 16, thereby completing processing of the packet 20.

Step 110: Transfer received sub-packet information (e.g., audio, video, control) to high-layers. In one example, the receiver uses the packet and Sub-packet field information (e.g., fields 32, 34, 36, 28) in the composite packet 20 to locate and retrieve the different information types (e.g., audio, video, control) included in the Payloads 29 in the received Sub-packets 26 within the composite packet 20, and provides the retrieved information to higher layers in the receiver for consumption and/or further processing.

Figure 10:
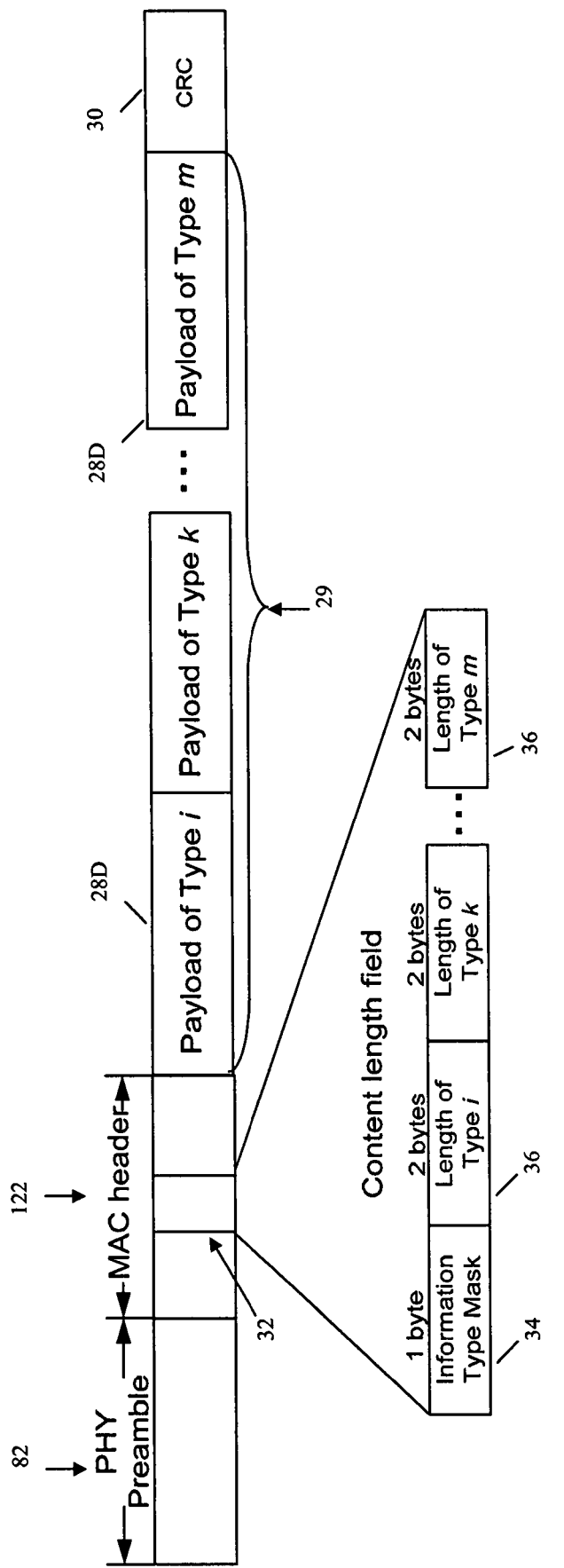
FIG. 10 shows a composite packet format for aggregating different types of information that require Equal Error Protection (EEP), according to an embodiment of the present invention.
Figure 11:
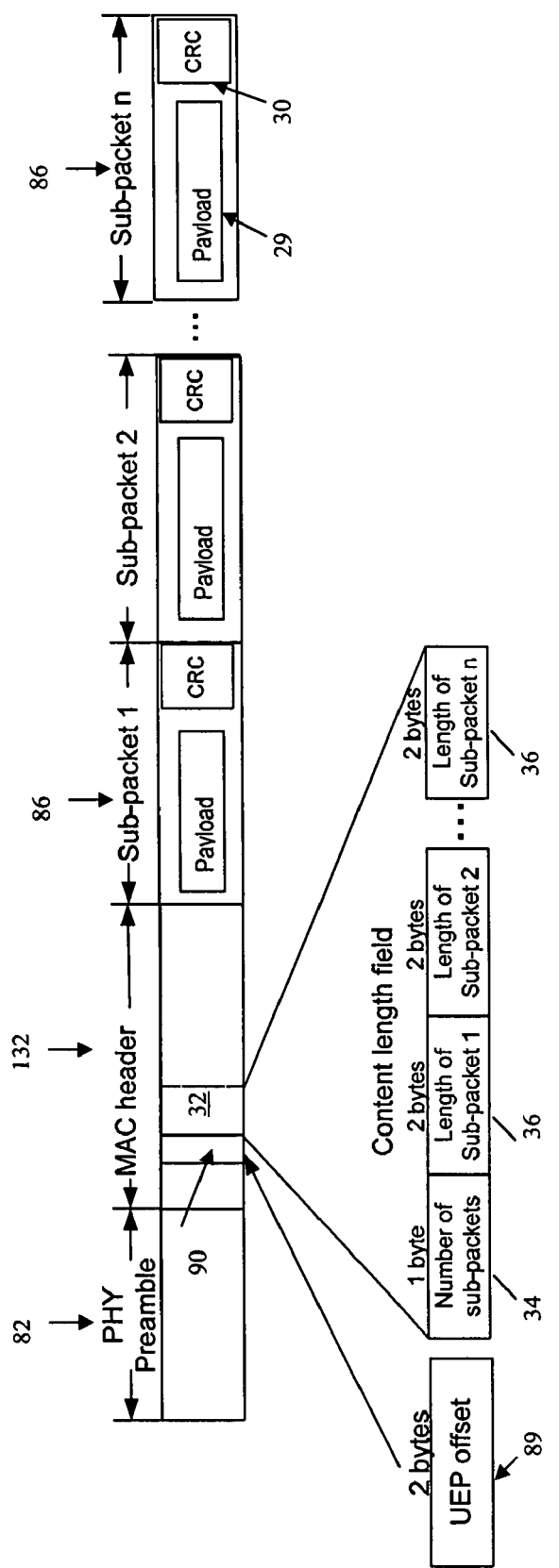
FIG. 11 shows a packet format for aggregating a single type of information that requires UEP, according to an embodiment of the present invention.

FIG. 10 shows another example composite packet frame format 120, which only aggregates different types of information such as control, audio and data, etc., that require EEP. Information such as video which requires UEP (e.g., uncompressed video which requires UEP), is packetized separately using the example packet format 130 shown in FIG. 11 for a single type of information. The packet 130 is a variation of the packet 80 in FIG. 7, and the MAC header 132 in the packet 130 includes an UEP offset 89 and a Content length field 32. The Payload 29 for each Sub-packet 86 is for the same type of information (e.g., uncompressed video).

Figure 12:
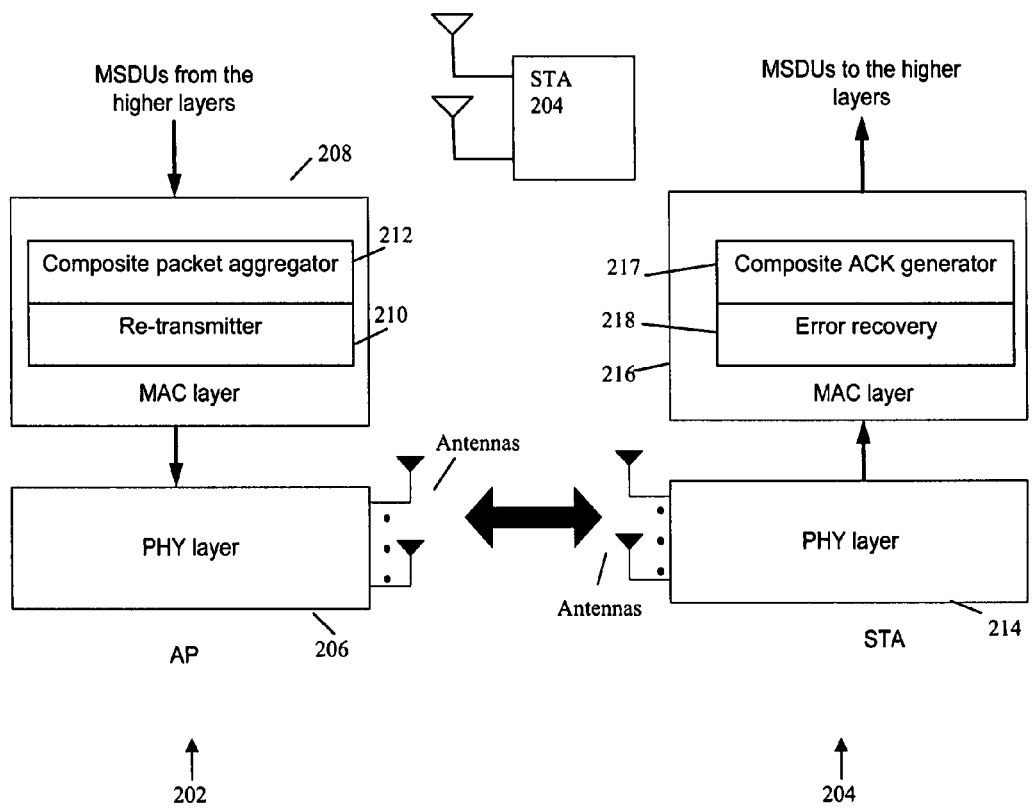
FIG. 12 shows an example function block diagram of a wireless communication system including a sender and a receiver implementing the processes in FIGS. 9A-B, according to the present invention.

FIG. 12 shows an example function block diagram of a wireless communication system 200 including an access point (AP) 202 as the coordinator 12 (FIG. 1), and at least one station (STA) 202 as a receiver device 14 (FIG. 1), implementing the communication processes in FIGS. 9A-B according to the present invention.

The AP 202 comprises a physical (PHY) layer 206 and a media access control (MAC) layer 208. The PHY layer 206 implements a type of IEEE 802.11 communication standard for transmitting data over a channel. The MAC layer 208 comprises a composite packet aggregator 212 and a re-transmitter 210, which together implement the steps in FIG. 9A. As such, the composite aggregator generates composite packets 20 for transmission to the STA 204, and the re-transmitter 210 that retransmits information based on ACK packets from a STA 204.

A STA 204 includes a PHY layer 214 corresponding to the PHY layer 206 of the AP 202. Each STA 204 further includes a MAC layer 216 that comprises a composite ACK generator 217 and an error recovery module 218, which together implement the steps in FIG. 9B. As such, the error recovery module 218 checks the CRC of received composite packets 20 for errors and the composite ACK generator 217 generates composite ACK packets accordingly for transmission to the AP 202. The error recovery module further uses the packet and Sub-packet field information (e.g., fields 32, 34, 36 and 28) in the composite packet 20 to locate and retrieve the different information types (e.g., audio, video, control) included in the Payloads 29 in correctly received Sub-packets 26 within the composite packet 20, and provides the retrieved information to higher layers in the receiver for consumption and/or further processing. Further, the error recovery module may use the UEP and EEP information in the packet 20 for error detection/recovery.

Although in FIG. 12, the modules 210, 214, 217 and 218 are implemented in MAC layers, as those skilled in the art will recognize, one or more of the modules 210, 214, 217 and 218 can be implemented in a different software, hardware, firmware layer. Further, although in the description of FIG. 12 the STAs and the AP have been shown separately, each is a type of wireless communication station capable of transmitting and/or receiving over a wireless channel in a wireless communication system such as a WLAN. Therefore, a wireless communication station herein can function as a transmitter, a receiver, an initiator and/or a responder. It then follows that an AP can function as a transmitter, a receiver, an initiator and/or a responder. Similarly, a STA can function as a transmitter, a receiver, an initiator and/or a responder.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for wireless communication of different information types, comprising:
    employing a processor for
    inputting information comprising different information types;
    forming a composite aggregation of the different information types comprising forming a composite information packet including multiple sub-packets for each sub-packet composite information packet, wherein each sub-packet includes a sub-header that comprises a mask that indicates the different information types in the sub-packet; and
    transmitting the composite aggregation from a wireless sender to a wireless receiver over a wireless channel.

2. The method of claim 1 wherein the different information types include audio, video, control and data.

3. The method of claim 1 wherein forming the composite aggregation of the different information types further includes forming the composite information packet including location information for each sub-packet composite information packet, wherein at least one of the sub-packets contains different information types.

4. The method of claim 3 wherein each sub-packet comprises:
    payload fields for different information types; and
    a sub-header that indicates: (a) the information types in that sub-packet, and (b) the length of payload fields for different information types in the sub-packet.

5. The method of claim 4 wherein the sub-header comprises a sub-packet index that indicates a sequence number of that sub-packet within the composite information packet.

6. The method of claim 4 wherein each sub-packet further includes a CRC value for the information types in the packet.

7. The method of claim 6 further comprising:
    receiving the composite information packet at a wireless receiver; and
    using the location information therein to locate and retrieve the different information types in the sub-packets within the composite information packet.

8. The method of claim 1 further comprising:
    receiving the composite aggregation at a wireless receiver;
    forming an aggregated acknowledgment; and
    transmitting the aggregated acknowledgment to the transmitter over a wireless channel.

9. The method of claim 8 wherein forming the aggregated acknowledgment comprises forming an aggregated acknowledgment that includes an acknowledgment for the different information types in the received composite aggregation, the method further comprising the transmitter retransmitting information based on the aggregated acknowledgment.

10. The method of claim 9 wherein:
    forming a composite aggregation of the different information types further includes forming a composite information packet including multiple sub-packets, wherein at least one of the sub-packets contains different information types; and
    forming an aggregated acknowledgment (ACK) includes forming a composite ACK packet that includes an acknowledgment for the different information types in the composite information packet.

11. The method of claim 10 wherein:
    the composite ACK packet further includes multiple ACK sub-packets, each ACK sub-packet includes an acknowledgment for a sub-packet of the composite information packet.

12. The method of claim 8 wherein the composite aggregation is transmitted over a high-rate channel.

13. The method of claim 12 wherein the aggregated acknowledgment is transmitted over a low-rate channel.

14. The method of claim 13 further comprising performing TDD for coordinating the usage of the high-rate and low-rate channels.

15. The method of claim 1 wherein forming the composite aggregation further includes providing Unequal Error Protection (UEP) for one or more information types in the composite aggregation.

16. The method of claim 1 wherein forming the composite aggregation further includes providing Equal Error Protection (EEP) for a plurality of different information types in the composite aggregation.

17. The method of claim 16 wherein:
    inputting information further includes inputting information comprising different information types and same information types;

forming the composite aggregation further includes providing UEP for same information types in the composite aggregation.

18. The method of claim 1 wherein the different information types include two or more of audio, uncompressed video, control and data.

19. A system for wireless communication of different information types, comprising:
a transmitter including a composite aggregator configured to form a composite aggregation of information comprising a composite information packet including multiple sub-packets, wherein at least one of the sub-packets contains different information types, and each sub-packet includes a sub-header that comprises an information mask that indicates the different information types in the sub-packet, and a communication module configured to transmit the composite aggregation over a wireless channel; and
a receiver configured to receive the composite information.

20. The system of claim 19 wherein the different information types include audio, video, control and data.

21. The system of claim 19 wherein the composite aggregation further comprises location information for each sub-packet composite information packet.

22. The system of claim 21 wherein each sub-packet comprises:
payload fields for different information types; and
each sub-header that indicates: (a) the information types in that sub-packet, and (b) the length of payload fields for different information types in the sub-packet.

23. The system of claim 22 wherein the sub-header comprises a sub-packet index that indicates a sequence number of that sub-packet within the composite information packet.

24. The system of claim 22 wherein each sub-packet further includes a CRC value for the information types in the packet.

25. The system of claim 24 wherein:
the receiver is configured to receive the composite information packet and uses the location information therein to locate and retrieve the different information types in the sub-packets within the composite packet.

26. The system of claim 19 wherein the receiver includes:
a communication module configured to receive the composite aggregation; and
an acknowledgment generator configured to form an aggregated acknowledgment;
wherein the communication module of the receiver is further configured to transmit the aggregated acknowledgment to the transmitter over a wireless channel.

27. The system of claim 26 wherein the aggregated acknowledgment comprises an acknowledgment for the different information types in the received composite aggregation, the transmitter further including a re-transmitter configured for retransmitting information based on the aggregated acknowledgment.

28. The system of claim 27 wherein:
the composite aggregation comprises a composite information packet including multiple sub-packets, wherein at least one of the sub-packets contains different information types; and
the aggregated ACK comprises a composite ACK packet including an acknowledgment for the different information types in the composite information packet.

29. The system of claim 28 wherein:
the composite ACK packet further includes multiple ACK sub-packets, each ACK sub-packet includes an acknowledgment for a sub-packet of the composite information packet.

30. The system of claim 26 wherein the composite aggregation is transmitted over a high-rate channel.

31. The system of claim 30 wherein the aggregated acknowledgment is transmitted over a low-rate channel.

32. The system of claim 31 further comprising the transmitter and the receiver are configured to perform TDD for coordinating the usage of the high-rate and low-rate channels.

33. The system of claim 19 wherein the composite aggregator is further configured to provide UEP for one or more information types in the composite aggregation.

34. The system of claim 19 wherein the composite aggregator is further configured to provide EEP for a plurality of different information types in the composite aggregation.

35. The system of claim 34 wherein the composite aggregator is further configured to provide UEP for same information types in the composite aggregation.

36. A transmitter for wireless communication of different information types, comprising:
a composite aggregator configured to form a composite aggregation of information comprising a composite information packet including multiple sub-packets, wherein at least one of the sub-packets contains different information types, and each sub-packet including a sub-header that comprises an information mask that indicates the different information types in the sub-packet; and
a communication module configured to transmit the composite aggregation over a wireless channel.

37. The transmitter of claim 36 wherein the different information types include audio, video, control and data.

38. The transmitter of claim 36 wherein the composite aggregation further comprises location information for each sub-packet composite information packet.

39. The transmitter of claim 38 wherein each sub-packet comprises:
payload fields for different information types; and
the sub-header that indicates: (a) the information types in that sub-packet, and (b) the length of the payload fields for different information types in the sub-packet.

40. The transmitter of claim 39 wherein the sub-header comprises a sub-packet index that indicates a sequence number of that sub-packet within the composite information packet.

41. The transmitter of claim 39 wherein each sub-packet further includes a CRC value for the information types in the packet.

42. The transmitter of claim 36 further including a re-transmitter configured to receive an acknowledgment for the composite packet from a receiver, and retransmit information based on the acknowledgment.

43. The transmitter of claim 36 wherein the composite aggregation is transmitted over a high-rate channel.

44. The transmitter of claim 36 wherein the composite aggregator is further configured to provide UEP for one or more information types in the composite aggregation.

45. The transmitter of claim 36 wherein the composite aggregator is further configured to provide EEP for a plurality of different information types in the composite aggregation.

46. The transmitter of claim 45 wherein the composite aggregator is further configured to provide UEP for same information types in the composite aggregation.

47. A receiver for wireless communication of different information types, comprising:
- a communication module configured to receive a composite aggregation over a wireless channel, the composite aggregation comprising a composite information packet including multiple sub-packets comprising a sub-header that comprises an information mask that indicates the different information types in the sub-packet, wherein at least one of the sub-packets contains different information types; and
- an acknowledgment generator configured to form an aggregated acknowledgment;
- wherein the communication module of the receiver is further configured to transmit the aggregated acknowledgment to the transmitter over a wireless channel.

48. The receiver of claim 47 wherein the aggregated acknowledgment comprises an acknowledgment for the different information types in the received composite aggregation.

49. The receiver of claim 48 wherein:
- the aggregated ACK comprises a composite ACK packet including an acknowledgment for the different information types in the composite information packet.

50. The receiver of claim 47 wherein:
- the composite aggregation further comprises location information for each sub-packet composite information packet,
- each sub-packet comprises: payload fields for different information types; and the sub-header that indicates: (a) the information types in that sub-packet, (b) the length of the payload fields for different information types in the sub-packet, and (c) the location of the information types in the composite aggregation; and
- the receiver is further configured to receive the composite aggregation and use the location information therein to locate and retrieve the different information types in the sub-packets within the composite packet.

51. The receiver of claim 47 wherein:
- the composite ACK packet further includes multiple ACK sub-packets, each ACK sub-packet includes an acknowledgment for a sub-packet of the composite information packet.

52. The receiver of claim 51 wherein the aggregated acknowledgment is transmitted over a low-rate channel.

53. A transmitter for wireless communication of different information types, comprising:
- a wireless communication device including a composite aggregator configured to form a composite aggregation of information comprising a composite information Media Access Control (MAC) packet including multiple sub-packets including a sub-header that comprises an information mask that indicates different information types in each sub-packet.

* * * * *